(12) United States Patent
Maloum et al.

(10) Patent No.: US 10,221,947 B2
(45) Date of Patent: Mar. 5, 2019

(54) METHOD FOR CONTROLLING THE SYNCHRONISATION OF A PINION ON A GEARBOX SHAFT

(71) Applicants: RENAULT s.a.s., Boulogne-Billancourt (FR); NISSAN MOTOR Co. Ltd, Yokohama-Shi (JP)

(72) Inventors: Abdelmalek Maloum, Chevilly-Larue (FR); Karima Nair, Versailles (FR)

(73) Assignees: RENAULT s.a.s., Boulogne-Billancourt (FR); NISSAN MOTOR Co. Ltd., Yokohama-Shi (JP)

( * ) Notice: Subject to any disclaimer, the term of this patent is extended or adjusted under 35 U.S.C. 154(b) by 128 days.

(21) Appl. No.: 15/303,317

(22) PCT Filed: Mar. 4, 2015

(86) PCT No.: PCT/FR2015/050521
§ 371 (c)(1),
(2) Date: Nov. 1, 2016

(87) PCT Pub. No.: WO2015/158971
PCT Pub. Date: Oct. 22, 2015

(65) Prior Publication Data
US 2017/0114897 A1 Apr. 27, 2017

(30) Foreign Application Priority Data
Apr. 14, 2014 (FR) ...................................... 14 53295

(51) Int. Cl.
*F16H 63/50* (2006.01)
*F16H 61/04* (2006.01)
*F16H 61/00* (2006.01)

(52) U.S. Cl.
CPC ....... *F16H 63/502* (2013.01); *F16H 61/0403* (2013.01); *F16H 2061/0078* (2013.01); *F16H 2061/0474* (2013.01); *F16H 2306/48* (2013.01)

(58) Field of Classification Search
CPC . F16H 63/502; F16H 61/0403; F16H 2306/48
See application file for complete search history.

(56) References Cited

U.S. PATENT DOCUMENTS

| | | | | |
|---|---|---|---|---|
| 7,373,233 | B2 * | 5/2008 | Gianoglio | B60W 10/06 477/78 |
| 9,376,106 | B2 * | 6/2016 | Ketfi-Cherif | B60W 10/02 |

(Continued)

FOREIGN PATENT DOCUMENTS

| | | |
|---|---|---|
| DE | 10 2006 019239 A1 | 10/2007 |
| EP | 2 354 599 A1 | 8/2011 |

(Continued)

OTHER PUBLICATIONS

International Search Report dated May 28, 2015 in PCT/FR2015/050521 filed Mar. 4, 2015.

(Continued)

*Primary Examiner* — David J Hlavka
(74) *Attorney, Agent, or Firm* — Oblon, McClelland, Maier & Neustadt LLP

(57) ABSTRACT

A method controls synchronization of a pinion rotating on a primary shaft driven by a traction machine of a vehicle and rotatably connected to a secondary shaft of a parallel shaft gearbox without synchronization mechanisms. The method includes sending to the traction machine, before coupling of the pinion on the primary shaft, a torque command which depends on a torque signal calculated to minimize a difference between a primary speed and a secondary speed multiplied by a reduction ratio between the primary shaft and the secondary shaft. The calculated torque signal is limited in amplitude when the speed difference is greater in (Continued)

absolute value than a desired accuracy on the targeted primary speed upon completion of the synchronization. The calculated torque signal is saturated on a maximum or minimum torque of the traction machine if the calculated torque signal is not between the maximum or minimum torque.

6 Claims, 2 Drawing Sheets

(56) References Cited

U.S. PATENT DOCUMENTS

| | | | |
|---|---|---|---|
| 2005/0054480 A1* | 3/2005 | Ortmann | B60K 6/365 477/6 |
| 2006/0080018 A1 | 4/2006 | Shimada et al. | |
| 2012/0259494 A1 | 10/2012 | Schaeffer et al. | |
| 2015/0051799 A1 | 2/2015 | Maloum | |
| 2016/0288783 A1* | 10/2016 | Maloum | F16H 61/0403 |

FOREIGN PATENT DOCUMENTS

| | | |
|---|---|---|
| FR | 2 954 441 A1 | 6/2011 |
| FR | 2 988 799 A1 | 10/2013 |

OTHER PUBLICATIONS

French Search Report dated Dec. 5, 2014 in FR 1453295 filed Apr. 14, 2014.

* cited by examiner

METHOD FOR CONTROLLING THE SYNCHRONISATION OF A PINION ON A GEARBOX SHAFT

BACKGROUND

The present invention relates to gear shifting control of a vehicle gearbox having at least one power source, such as an internal combustion traction engine and/or an electrical traction machine.

More specifically, it relates to a method for controlling the synchronization of a pinion rotating on a primary shaft driven by a traction machine of the vehicle, and rotatably connected to a secondary shaft of a parallel shaft gearbox, without synchronization mechanisms. This method is based on sending to the traction machine, before coupling of the pinion on the primary shaft, a torque command to minimize the difference between the primary speed and the secondary speed multiplied by the reduction ratio between these two shafts.

This invention is applicable to all parallel shaft transmissions, wherein gear changes are made by moving a coupling means without synchronizing rings, particularly in electric and hybrid drive trains.

When a system of coupling by engagement of a sliding gear on the pinions has no mechanical synchronization means, the rotating elements can be synchronized by controlling the primary speed of the gearbox. This controlling requires precise control of the speed by the traction machine in order to avoid torque shocks.

Publication FR 2 988 799 discloses a known method for synchronizing a pinion with its shaft, without a mechanical synchronizer. According to this method, the traction machine of the vehicle is controlled to minimize the difference between the primary speed and the secondary speed of the gearbox, multiplied by the gear ratio between the two shafts. The advantage of the process is to maintain the control of the traction machine until the speeds of the electrical machine shaft and the shaft connected to the wheels are completely equalized, to within the gear ratio. However, its accuracy comes up against the inertia of the traction machine and its time of response to the torque control instructions, especially when this traction machine is an internal combustion engine. The main difficulties are encountered during hard braking, on a steep slope.

In order for shifting to take place in satisfactory conditions, the operation must be completely transparent for the driver, while continuing to meet the demand for torque at the wheel. In particular, the speed difference must reach the 30 rpm (rotations per minute) range very rapidly.

BRIEF SUMMARY

The purpose of the present invention is to ensure the synchronization of two gearbox shafts in a minimum amount of time, before starting the shaft coupling phase.

To this end, it proposes to limit the amplitude of a calculated torque signal, when the speed difference is greater in absolute value than the desired accuracy on the targeted primary speed upon completion of the synchronization phase.

The process allows for smooth gear changes in all circumstances, especially during hard braking on steeply-descending ramps. It eliminates the main sources of torque shocks that may be incurred during the coupling phase. Excessive wear of the mechanical parts of the coupling system is thus avoided.

BRIEF DESCRIPTION OF THE DRAWINGS

Other features and advantages of the invention will become more clearly apparent from the description which follows of a non-limiting embodiment thereof, given with reference to the accompanying drawings, wherein.

DETAILED DESCRIPTION

Figure 1:
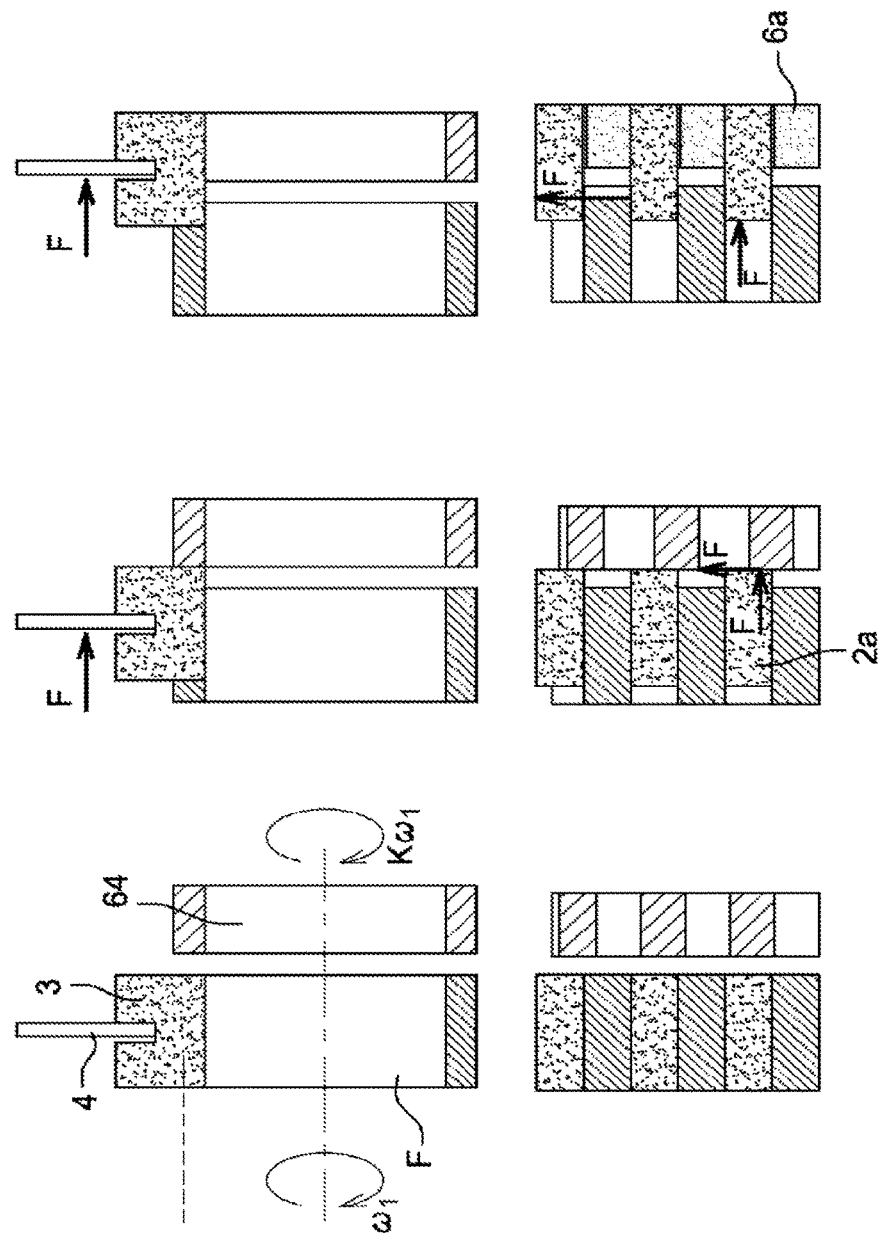
FIGS. 1A-1C are a schematic representation of the coupling.

FIGS. 1A to 1C represent a schematic diagram of a gear shifting sliding gear 2 and its sleeve 3, its control fork 4 and a gear pinion 6. Teeth 2a and 6a of the sliding gear and the pinion are also shown in the lower part of the diagrams. The sliding gear 2 and the pinion 3 are coaxial on a "primary" gearbox shaft (not shown) connected to a power source (traction machine) of the vehicle. The pinion 6 is rotatably connected to a secondary gearbox shaft connected to the wheels of the vehicle.

FIG. 1A represents the initial state of the system, in neutral. The sliding gear 2 rotates at the speed $\omega_1$ which is that of the primary shaft. The pinion rotates at a speed $\omega_2$, different from $\omega_1$, which is imposed by a secondary shaft of the gearbox. In FIG. 1B, the sliding gear 2 has moved until its teeth 2a encounter those of the pinion 6. When their rotational speeds are equalized, i.e. upon completion of the synchronization phase, the teeth of the sliding gear mesh with those of the pinion to engage the gear: this is the coupling phase of the pinion and the sliding gear.

The purpose of the proposed control strategy is to render the coupling phase of the sliding gear and the pinion as transparent as possible, i.e. practically without torque shock. To achieve this, the synchronization is controlled so as to transmit the minimum amount of torque to the coupler during the coupling phase.

In the following description of the strategy illustrated in FIG. 2, the following notations are adopted:

$\omega_1$: Speed of the primary shaft and the sliding gear 2 linked to the power source;
$T_1$: Torque of the power source;
$T_{d1}$: Resisting torque of the power source (unknown exogenous input);
$J_1$: Inertia applied to the shaft of the sliding gear 2;
$\omega_2$: Speed of the pinion 4 which serves as a target to be reached;
$T_{d2}$: Resisting torque of the pinion 4 (unknown exogenous input);
$J_2$: Inertia applied to the pinion 4;
K: Reduction ratio between the primary and secondary shafts;

By supposing that the two shafts of the gearbox are completely uncoupled in the initial state, and by applying the fundamental principle of mechanics, the following dynamic model is obtained:

for the secondary shaft (pinion 6): $J_2 \dot{\omega}_1 = T_{d2}$, resisting torque of the secondary, and for the primary shaft (sliding gear 2): $J_1 \dot{\omega}_1 = T_1 + T_{d1}$, sum of the engine torque and the resisting torque of the primary.

According to FIG. 2, the primary and secondary shafts are synchronized (to within the gear ratio K) by producing a reference command signal $T_1^{ref}$ in the following manner. The measured reference signal $\omega_2^{mes}$ (secondary speed) is multiplied by the reduction ratio K, to compare the product K. $\omega_2^{mes}$ to the reference signal $\omega_2^{mes}$ (primary speed). The sign and the amplitude of the difference $\sigma = K.\omega_2^{mes} - \omega_1^{mes}$ make it possible to calculate a torque value $T_1^{calc}$ to be applied to the input of the power source or electric or internal combustion traction machine. The torque command $T_1^{ref}$ depends on the torque signal $T_1^{calc}$ calculated to minimize the difference $\sigma$ between the primary speed $\omega_1$ and the secondary speed $\omega_2$ multiplied by the reduction ratio K between these two shafts. The calculated torque $T_1^{calc}$ is monitored to determine if it is between the minimum and maximum torques $T_1^{min}$ and $T_1^{max}$ of the traction machine. If this is not the case, the signal $T_1^{talc}$ is saturated on one of these values.

The speed difference $\sigma$ is compared to a calibrated parameter $\varepsilon$, representing the accuracy that it is desired to reach on the primary speed target. $\varepsilon$ is the speed difference tolerated between the target and the primary speed value obtained upon completion of the synchronization phase. When $\sigma > \varepsilon$ or $\sigma < -\varepsilon$ (difference $\sigma$ is greater in absolute value than the desired accuracy $\varepsilon$, on the targeted primary speed $\omega_1$ upon completion of synchronization phase), the calculated torque $T_1^{talc}$ is limited in amplitude by a calibrated coefficient $\alpha$, greater than or equal to 1. More specifically, the amplitude of the calculated torque signal $T_1^{calc}$ is thus limited on values equal to the ratio of the maximum $T_1^{max}$ and minimum $T_1^{min}$ torques of the traction machine to a calibrated limitation coefficient $\alpha$. The values $T_1^{min}/\alpha$ or $T_1^{max}/\alpha$ determine the traction torque that can be used for the synchronization.

When the difference $\sigma$ is greater in absolute value than the accuracy $\varepsilon$, the calculated torque $T_1^{talc}$ is smoothed, for example by applying thereto a formula of the type:

$$T_1^{calc} = \frac{(\sigma + \varepsilon)T_1^{min} - (\sigma - \varepsilon)T_1^{max}}{2\alpha\varepsilon}$$

Another innovation of the invention consists in activating an integration operation of the difference $\sigma$ multiplied by a calibrated gain $K_i$, when this difference is lower in absolute value than the desired $\varepsilon$ accuracy $\varepsilon$. The gain $K_i$ has a non-zero value $K_i^{\#}$. Otherwise $K_i$ is zero, and the integrated correction term is also zero. The calculated torque $T_1^{talc}$ is corrected by this integration term. As shown in the figure, the integration term is added to the signal $T_1^{calc}$ from the previous amplitude limitation or smoothing steps.

The torque command signal $T_1^{ref}$ of the traction machine is obtained by limiting the calculated signal $T_1^{calc}$ in a "limiter", between the maximum torque $T_1^{max}$ and minimum torque $T_1^{min}$ values of the traction machine. This limitation is made after the possible correction of the calculated signal $T_1^{calc}$, by the integrated term.

Figure 2:
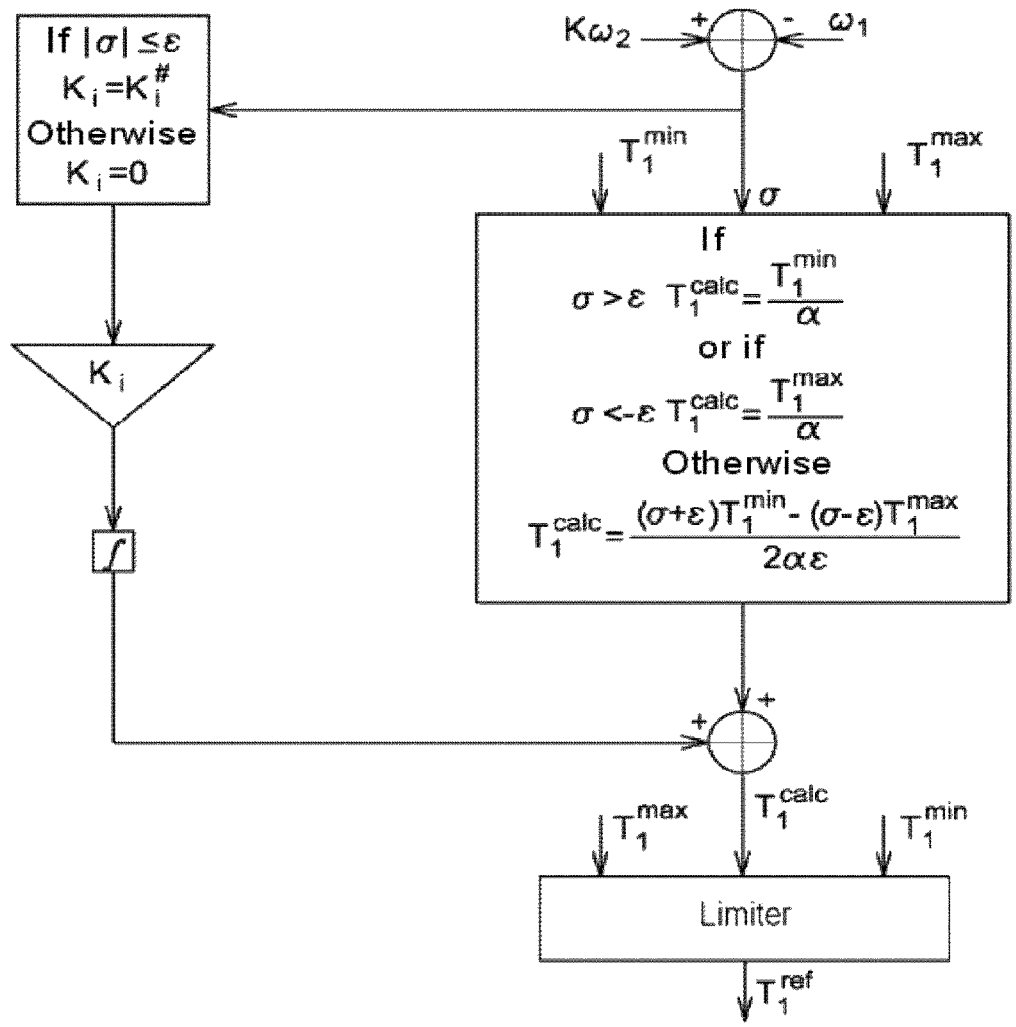
FIG. 2 provides a summary of the method of the invention in the form of a logic diagram.

Finally, the corrected signal $T_1^{calc}$ is limited between the maximum and minimum torque values $T_1^{min}$ and $T_1^{max}$ in the "limiter" mentioned in FIG. 2, which delivers the reference command signal $T_1^{ref}$ of the traction machine, to synchronize the sliding gear 2 and the pinion 6.

When the rotating elements are synchronized, the second phase, or coupling phase, consisting in moving the sliding gear from its "open" position to its "closed", may take place.

In conclusion, the strategy implemented by the invention makes it possible to reduce the speed difference very quickly to reach a value of approximately 30 rpm. The method makes the following coupling phase of the two shafts satisfactory for the user, despite the resumption of torque, i.e. with the least possible torque shock. It notably allows for the management of ramp type trajectory tracking, corresponding to the unfavorable cases of hard braking mentioned above. Finally, convergence toward the target speed is not dependent on the system's intrinsic parameters (such as the inertia and the response time of the actuators and/or the traction machine, or possible delays), which makes this strategy robust. It is valid regardless of the type of power source solicited for the synchronization, whether it is an electric machine or an internal combustion engine, whether or not it rotates at an idling speed, transmitting torque to the wheels or not.

The invention claimed is:

1. A method for controlling synchronization of a pinion rotating on a primary shaft driven by a traction machine of a vehicle and rotatably connected to a secondary shaft of a parallel shaft gearbox without synchronization mechanisms, comprising:
    sending to the traction machine, before coupling of the pinion on the primary shaft, a torque command which depends on a calculated torque signal that is calculated to minimize a difference between a primary speed and a secondary speed multiplied by a reduction ratio between the primary shaft and the secondary shaft,
    wherein the calculated torque signal is limited in amplitude when the difference between the primary speed and the secondary speed is greater in absolute value than a desired accuracy on a targeted primary speed upon completion of synchronization of the pinion, the calculated torque signal being saturated on a maximum torque or a minimum torque of the traction machine if the calculated torque signal is not between the maximum torque and the minimum torque.

2. The control method as claimed in claim 1, wherein the amplitude of the calculated torque signal is limited on values equal to a ratio of the maximum torque and the minimum torque of the traction machine to a calibrated limitation coefficient, when the difference between the primary speed and the secondary speed is greater in absolute value than the desired accuracy on the targeted primary speed upon completion of the synchronization.

3. The control method as claimed in claim 1, wherein the calculated torque signal is smoothed, when the difference between the primary speed and the secondary speed is greater in absolute value than the desired accuracy on the targeted primary speed upon completion of the synchronization.

4. The control method as claimed in claim 1, wherein the calculated torque signal is corrected by an integration of the difference between the primary speed and the secondary speed with a non-zero calibrated gain, when the calculated torque signal is lower in absolute value than the desired accuracy.

5. The control method as claimed in claim 1, wherein the torque command of the traction machine is obtained by limiting the calculated torque signal between values of the maximum torque and the minimum torque of the traction machine.

6. The control method as claimed in claim 1, wherein the calculated torque signal is corrected by an integration of the difference between the primary speed and the secondary speed with a non-zero calibrated gain, when the calculated torque signal is lower in absolute value than the desired accuracy, and then the torque command of the traction machine is obtained by limiting the calculated torque signal between values of the maximum torque and the minimum torque of the traction machine.

\* \* \* \* \*